Nov. 15, 1966  B. MORRISON  3,285,290
METHOD AND APPARATUS FOR PLUGGING PIPELINES
Filed April 23, 1962  2 Sheets-Sheet 1

INVENTOR
BILL MORRISON
BY
ATTORNEY

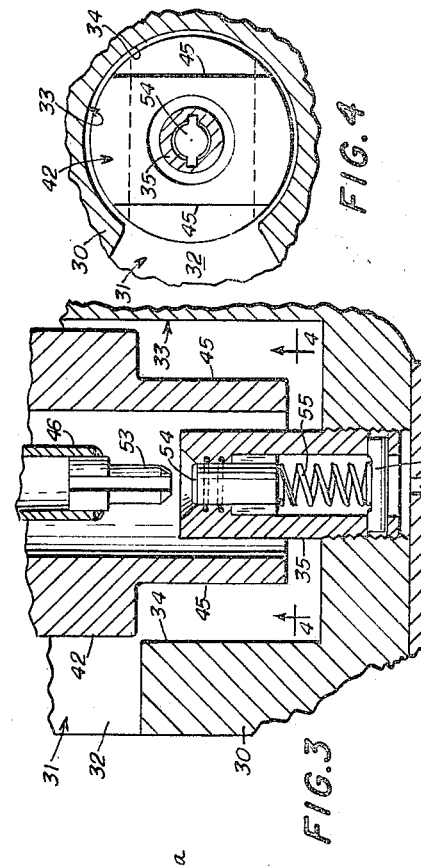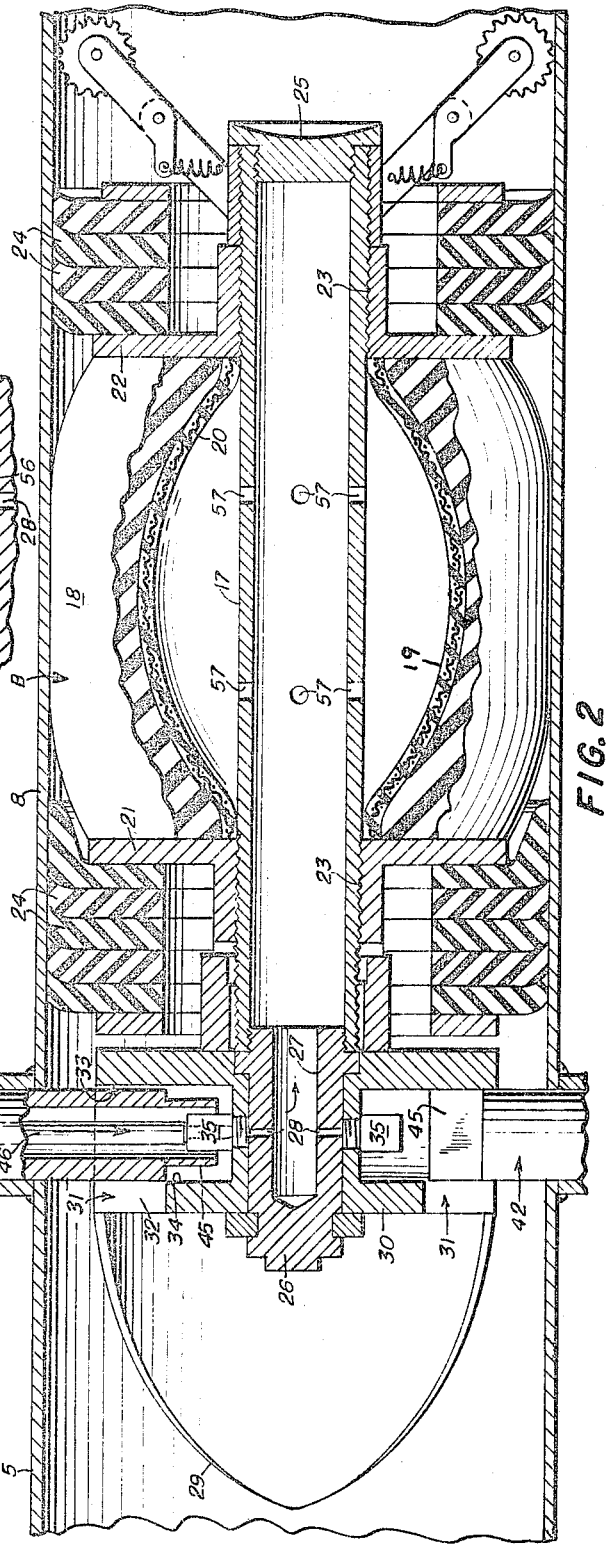

United States Patent Office 3,285,290
Patented Nov. 15, 1966

3,285,290
METHOD AND APPARATUS FOR
PLUGGING PIPELINES
Bill Morrison, Tulsa, Okla., assignor to Benson Electric
Company, Superior, Wis., a corporation of Wisconsin
Filed Apr. 23, 1962, Ser. No. 189,506
15 Claims. (Cl. 138—97)

This invention relates to a method and apparatus for plugging fluid pipelines preparatory to making repairs or testing new pipeline installations and represents an improvement on the method and apparatus disclosed in my prior Patent No. 2,929,410, issued on March 22, 1960.

The invention described and illustrated in my said prior patent embodies a method and apparatus for evacuating and isolating a section of pipeline by the use of two internally transportable plugging units arranged in a temporarily connected pair, means being provided for initially stopping the pair and locating one plugging unit at the upstream terminus of the section to be isolated, the second plugging unit of said pair being releasible by the operator and transportable internally to the downstream terminus of the section isolated. Here it is stopped and operatively located, the evacuation of the isolated section being accomplished by the second plugging unit during the course of its travel through the section to be isolated.

While tests of the apparatus embodying releasibly connected plugging devices have proven satisfactory, certain objectionable features have become apparent and the present invention is primarily directed to improvements which have overcome such objectionable features. For example, the incorporation of a releasible connection between the two plugging units, as well as the particular wedge-type, expandible sealing devices, have required rather complicated mechanisms which, while completely operable, have increased the costs of initial construction and maintenance, and the number of parts involved has naturally reduced the overall efficiency of the apparatus.

It is therefore the primary object of the present invention to provide a plugging apparatus which, while possessing all of the advantages of that disclosed in my said prior patent, eliminates the disadvantages referred to, as well as providing certain additional advantages not heretofore contemplated. Thus, the present invention is a refinement of that disclosed in my said prior patent and embodies the same basic principle employed therein, namely, the isolation and simultaneous evacuation of a section of pipeline to be repaired or replaced, by separately introducing two plugging devices for internal transportation through the pipeline and selectively stopping and expanding the respective devices to define the upstream and downstream termini of the section of pipeline to be worked on.

The leading plugging device is temporarily stopped by externally controlled means, just downstream of the upstream terminus, while the trailing plugging device is positioned and expanded at the upstream terminus. Thereafter, the leading plugging device is released and its transportation resumed under the influence of an inert pressure fluid until it reaches the downstream terminus of the section to be worked on, where it is stopped and expanded to complete the sealing off of said section. During the course of its continued travel to said downstream terminus, the leading plugging device acts as a plunger to evacuate the fluid normally flowing through said section.

Another object of the present invention is to provide hydraulically operated sealing means for the plugging units, instead of the wedge actuated mechanisms described in my said former patent. This greatly simplifies the apparatus, both from the standpoint of construction and operation, and, naturally, affords increased efficiency.

In the course of various tests of this apparatus and method, it has been found that an accumulation of sand builds up from time to time during the travel of the plugging devices through the pipeline, and with connected plugs, when this sand finds its way past the push rubbers of the leading plugging device and collects between the two plugging devices, the accuracy of locating the trailing device is endangered. Hence, by providing disconnected plugging devices and stopping the leading device at a point in advance of the trailing device and then setting the positioning means for the trailing device, the release of the stop means for the leading device and the introduction of pressure behind the latter assures the accurate positioning of the trailing device, despite an accumulation of sand.

A further object of the present invention is to provide both plugging devices with cam noses for individually directing the plug locking means into their respective operative positions.

With the above and other objects in view which will appear as the description proceeds, the invention consists in the novel features hereinafter set forth, illustrated in the accompanying drawings and more particularly pointed out in the appended claims.

Referring to the drawings in which numerals of like character designate similar parts throughout the several views:

FIG. 1D shows both plugging devices stopped in the pipeline with the trailing device expanded to define the upper terminus of the section of pipe to be worked on;

FIG. 1F shows the leading device stopped and expanded, thus defining the downstream terminus of the section of pipe to be worked on;

FIG. 2 is an enlarged longitudinal sectional view illustrating one form of the plugging device in stopped and sealed position in a pipeline;

FIG. 3 is an enlarged sectional view of the plug stopping element and valve operating mechanism shown in FIG. 2; and FIG. 4 is a sectional view taken on line 4—4 of FIG. 3.

Briefly stated, the method of the present invention contemplates the isolation and simultaneous evacuation of a section of pipeline to be repaired or altered, and comprises introducing into a pipeline through a conventional scraper trap a pair of individually expansible plugging units at spaced intervals and internally transporting both the leading and trailing units by the normal pipeline fluid pressure to a first location where they are sequentially stopped by externally actuated plug positioning and control means. The trailing unit is first expanded and sealed in the pipeline to define the upstream terminus of the pipeline section to be worked on, after which the leading unit is released from its initial stopping means and transported by separately introduced fluid pressure to a second location defining the downstream terminus of the section of pipeline to be worked on, the movement of said leading unit simultaneously evacuating the fluid in the intervening pipeline area. At the downstream terminus, the leading unit is stopped by externally actuated plug positioning and control means and expanded and sealed in the pipeline, after which the separately introduced fluid employed in transporting the leading unit to its destination is withdrawn.

Figure 1A:
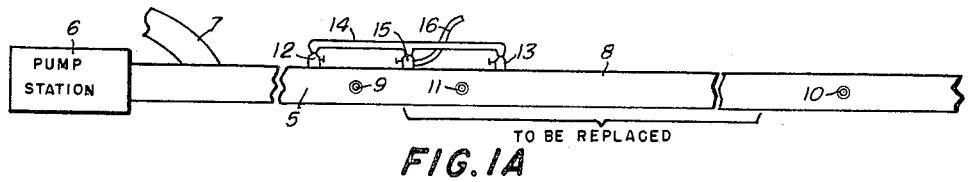
FIG. 1A is a diagrammatic view showing a conventional pipeline and indicating the section of pipe to be replaced.

Referring first to FIGS. 1A–1H of the drawings, 5 represents a conventional pipeline for oil, gas or other fluid which is provided at predetermined intervals, usually many miles apart, with pumping stations 6 where the pipeline is provided with conventional pig or scraper traps 7. In FIG. 1A, the section of pipe to be replaced or worked on is indicated at 8, and in preparing the pipeline for repair, a plurality of collars are welded to the pipeline at selected points for subsequent installation of gate valves to control the insertion of plug stopping and inflation means and for bypassing the fluid entrapped between the two plugging devices, as will later appear.

Collars 9 and 10 are located in the periphery of the pipeline, respectively defining the upstream and downstream termini of the section 8 to be worked on. Collar 11 is similarly located in the periphery of the pipeline a predetermined distance downstream from the collar 9, for initially stopping the leading plugging device. In practice, the collars 9, 10 and 11 are duplicated on opposite sides of the pipeline. Adjacent the upstream terminus of the section to be worked on, the periphery of the pipeline is provided with a bypass arrangement comprising valved connections 12 and 13, respectively located anterior to the collar 9 and posterior to the collar 11 and connected by a bypass line 14. Intermediate the connections 12 and 13, a third valved connection 15 is provided which also communicates with the bypass line 14. A line 16 leading from a separate source of fluid pressure (not shown) is applied to the valved connection 15 for the reason hereinafter described.

For the purposes of this description, the leading plugging device will be designated as A and the trailing device as B, and inasmuch as both devices are identical, a description of one embodiment of a plugging device as illustrated in detail in FIG. 2, will suffice. In this figure which shows the plugging device disposed in the opposite direction from FIGS. 1A to 1H, it will be seen that a longitudinally extending central supporting tube 17 is provided intermediate its ends with a coaxial and radially expandible pipeline sealing element 18. This sealing element may be composed of rubber or any suitable expandible material, and is preferably provided with an inner flexible lining 19 which is reinforced with an embedded wire mesh 20, so woven as to permit expansion and contraction with the liner. The sealing element 18 and lining 19 envelope the intermediate portion of the support 17 and their longitudinal extremities are sealed by any suitable means to end plates 21 and 22 which are coaxially mounted on the central support 17 by means of complementary threads 23.

A series of annular push rubbers 24 of conventional form are supported at opposite ends of the sealing member 18 and are of a diameter to slidably embrace the inner periphery of the pipeline 5 so that under the influence of fluid pressure behind the plugging device, the latter will be caused to travel through the pipeline. The push rubbers also serve the purpose of centering the plugging device in the pipeline.

The rear end of the central tube 17 is sealed by an end closure 25 and its forward end screw threadedly supports a hub 26 having a central fluid passageway 27 communicating with the interior of the supporting tube 17 and having radial ports 28 for the admission of fluid pressure, as will later appear. A cam nose 29 generally similar to that shown in my said prior Patent No. 2,929,410, is rotatably supported on hub 26 at the leading end of the sealing member, the base 30 of the nose which rotatably embraces the hub 26, being provided in its forward face with flaring slots 31, having restricted throats 32 which open into pin receiving and locking recesses 33 as seen in FIG. 4. As in the case of my said prior patent, the cam surfaces of the double cam nose 29 respectively recede from the apex of the nose and terminate on opposite sides of the base 30, contiguous with the slots 31. Returning to FIG. 2, the oppositely arranged recesses 33 are extended or deepened toward the axis of the unit to provide wells 34 in the base 30, the bottoms of which are drilled and threaded to receive valve sleeves 35 which communicate with the respective ports 28 for the admission of fluid to the interior of the central support 17, as will be hereinafter described.

Each of the collars 9, 10 and 11 on the periphery of the pipeline, through which the stopping and locking pins are to operate, must be provided with a suitable valve for the reason that the pipeline being worked on will be under pressure. Therefore, although not shown in detail in FIG. 2, a suitable gate valve is located above the collar 9 at 36, by the use of suitable flanges 37 and 38. The upper face of the flange 38 of the valve 36 is provided with an upstanding cylindrical neck 39 which fixedly supports a frame 40, a central opening 41 in the base of the frame 40 being arranged coaxial with the collar 9 to slidably receive a tubular locking pin 42 for projection and retraction through the valve 36 and an aligned opening in the pipeline within the confines of the collar 9.

Projection and retraction of the tubular locking pin is effected by means of a transverse yoke 43, secured to the upper end of the locking pin 42 and threaded at its opposite ends to engage the complementary threads of actuating screws 44. The screws 44 are mounted for free rotation with respect to the frame 40 and extend vertically in parallel relation so that when simultaneously rotated in a common direction by any suitable means, the yoke 43 and with it the locking pin 42, are caused to move either toward or away from the axis of the pipeline 5. When rotated in one direction, the locking pin is extended into the interior of the pipeline through the neck 9, and when rotated in the opposite direction, the locking pin is retracted, as and for the purpose later described.

The inner extremity of each of the locking pins 42 is reduced or flattened on two opposite sides as at 45 to provide a reduced area of a thickness to be easily accommodated by the restricted throats 32. The non-flattened areas, however, are of the same diameter as the remainder of the respective locking pins 42. Thus, the end of each pin when properly positioned, is enabled to enter the slots 31 and recesses 33, but when turned 90° will be locked within the recesses as seen in FIG. 4. This turning of the locking pin may be effected by a suitable handle 40a welded to the base of the frame 40. In other words, the rotation of the frame by the handle 40a causes the proper rotation and positioning of the lower flattened end 45 of the locking pin within the recess 33.

Briefly, the operation of this stopping and locking mechanism is as follows. Prior to the introduction of the plugging devices A and B into the pipeline, the locking pins in collars 11 and 10 are extended into the interior of the pipeline 5 to a depth to align their lower ends with the slots 31 and the upper areas of the recesses 33, and the locking pins are rotated to position the flattened areas at their lower extremities for entrance into the recesses 33. Initially, the locking pin 42 in upstream collar 9 is completely retracted from the interior of the pipeline so as to permit free passage of the leading plugging device downstream in the pipeline. However, after the leading plugging device A has passed the collar 9 for the sequence of operations to be hereinafter described, the locking pin 42 in collar 9 is projected into the pipeline in the manner just described and positioned to intercept the trailing plugging device B.

When the plugging device B is intercepted by the entry of the stopping pin 42 into the recess 33, the locking pin 42 is rotated by means of the handle 40a and frame 40 so that the flattened areas 45 are crosswise in the recess 33. Then, by means of the pin operating screws 44, the locking pin is further extended into the well 34 at the base of the recess 33 with the hollow central portion of the tubular locking pin surrounding the valve sleeve 35. The lower locking pin in FIG. 2 is shown in the first or intercepting position, while the upper locking pin is shown in its innermost and locked position in the well 34.

The trailing plugging device B is the first to be hydraulically expanded and sealed at the upstream terminus of the pipe section to be worked on and this is accomplished as follows, again referring to FIG. 2. Each of the stopping and locking pins 42 is provided with a retractible and projectible tube 46 which extends concentrically through the hollow interior of the tube, its upper end being threaded as at 47 for engagement with the complementary internal threads of a rotatable operating nut 48 carried on the top face of the yoke 43. This nut 48 is fixed against axial movement with respect to the yoke 43 by means of keys 49 fixed to the yoke 43 and slidably received with a radial recess 50 in the periphery of the nut 48. Thus, rotation of the nut 48 in one direction or the other causes either the projection or retraction of the tube 46.

The upper extremity of the tube 46 carries a supply head 51 having a connection 52 leading to a source of hydraulic fluid under pressure (not shown) and communicating with the central bore of the tube 46. As best seen in FIG. 3, the lower end of the tube 46 is provided with a valve actuating stem 53, concentrically arranged with respect to the valve sleeve 35 and, upon the inward movement of the tube 46, adapted to depress the valve member 54 in the sleeve 35. Preferably, the valve member 54 is normally urged upwardly to closed position by coil spring 55, the lower end of which is supported by a cross pin 56 or other suitable means at the lower end of the sleeve 35. Thus, when the tube 46 is depressed by rotating the operating nut 48, the stem 53 depresses the valve member 54 and permits the entrance of hydraulic pressure through the valve sleeve and port 28 into passageway 27 from whence it enters the tubular support 17. From the tube 17 the pressure fluid passes through radial ports 57 and inflates the seal member 18 until it tightly engages the inner periphery of the pipeline 5, thus sealing that particular point in the pipeline.

Figure 1B:
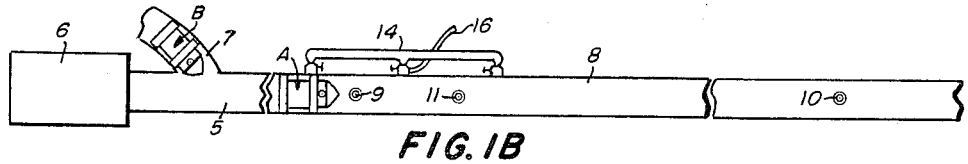
FIG. 1B is a similar view showing the leading plugging device inserted in the pipeline and the trailing device in the course of being inserted.

The sequence of operations will best be understood by reference to FIGS. 1A–1H. In FIG. 1A, the various collars 9, 10 and 11 and their gate valves and stopping and locking pins have been installed. Also, the bypass line 14 and its control valves have been installed. In FIG. 1B, the leading plugging device A has been introduced and is in the course of travel down the pipeline 5, and the trailing plugging device B is being introduced through the scraper trap 7. Ordinarily, the introduction of the trailing device B is delayed for a period of approximately 30 minutes after the leading device has been introduced.

Figure 1C:
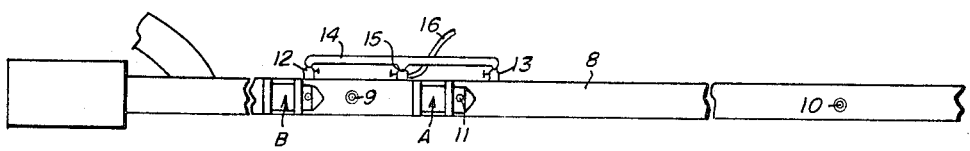
FIG. 1C shows the leading plugging device stopped in the pipeline and the trailing device approaching its stopping point.
Figure 1D:
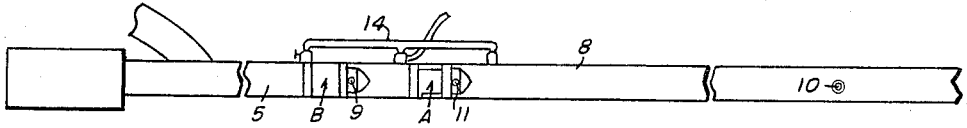

In FIG. 1C, the leading plugging device A has been stopped at the collar 11 slightly past the collar 9, and has been locked in place by the respective locking pin mechanism previously described. However, the leading device A is not inflated at this point. After the leading device A has been stopped, the valves 12 and 13 are opened to permit the bypassing of fluid through line 14 as the trailing device B approaches its stopping point. FIG. 1D shows the trailing device B stopped and locked in place and expanded by the introduction of hydraulic fluid pressure in the manner just described, thus defining the upstream terminus of the section of pipeline to be worked upon. The bypass valve 12 is then closed and the valve 15 opened to permit the introduction of an inert fluid from line 16 behind the leading plugging device A which is then released from its stopping and locking pin in collar 11.

Figure 1E:
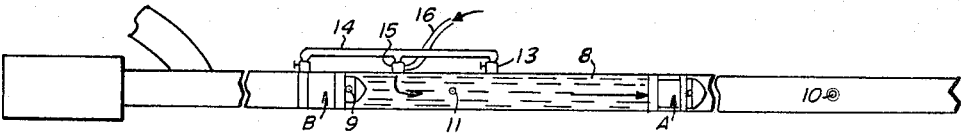
FIG. 1E shows the leading device released and continuing through the pipeline under the influence of an inert fluid.
Figure 1F:
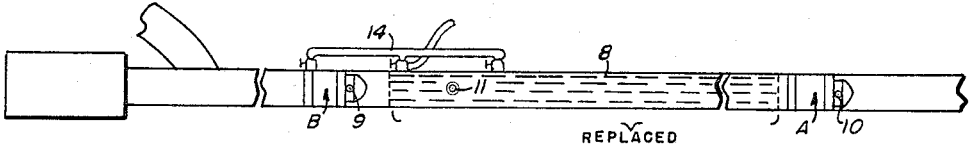
Figure 1G:
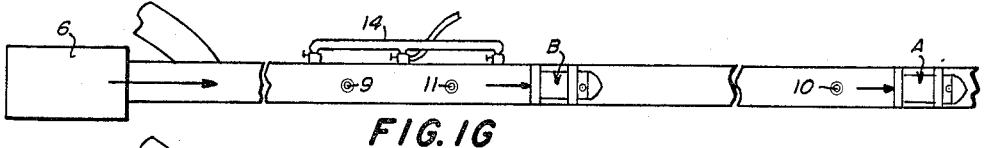
FIG. 1G shows both plugging devices released and travelling downstream in the pipeline for subsequent removal.

FIG. 1E shows the trailing plugging device B in its stopped and expanded position, and the leading device A continuing downstream under the influence of the inert fluid introduced behind it. Upon reaching the downstream collar 10 and its stopping and locking pin, the leading plugging device A is stopped, locked and expanded, thus defining the downstream terminus of the section of pipe to be worked upon. During the course of its travel from collar 11 to collar 10, the leading plugging device A has evacuated all of the fluid in the section of pipe to be worked on, leaving behind it only the inert fluid which is then exhausted by suitable valves.

Figure 1H:
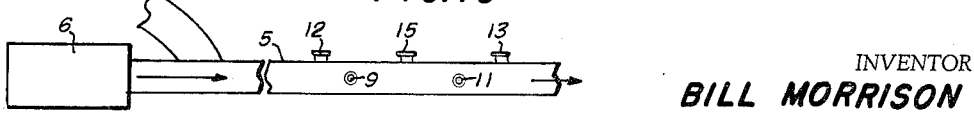
FIG. 1H shows the pipeline after removal of the valves and stopping devices upon completion of the repair work.

After completion of the work on the section of pipeline, both plugging devices are deflated and conducted downstream by the force of the fluid passing through the pipeline, and they are removed from the pipeline at the next pumping station. After all of the work has been completed, the various valves and bypass lines are removed and the collars plugged and welded closed as shown in FIG. 1H.

From the foregoing, it is believed that the invention may be readily understood by those skilled in the art without further description, it being borne in mind that numerous changes may be made in the details disclosed without departing from the spirit of the invention as set forth in the following claims.

I claim:

1. A method of isolating and simultaneously evacuating a section of pipeline, comprising installing externally controlled plug stopping devices in the wall of said pipeline at points defining the upstream and downstream extremities of said section, installing an auxiliary, externally controlled plug stopping device in the wall of said pipeline at a point adjacent to but spaced downstream from said upstream stopping device, independently introducing first and second portable, radially expandible plugs into said pipeline anterior to said upstream extremity, sequentially transporting said plugs through said pipeline by means of the fluid flowing therein, stopping said first plug by actuating said auxiliary plug stopping device, stopping and expanding said second plug at the upstream extremity of said section, releasing said first plug from said auxiliary stopping device, introducing into said section behind said first plug, an inert pressure fluid, transporting said first plug through said second under the force of said inert fluid to thereby evacuate the fluid in advance thereof, stopping and expanding said first plug at the downstream extremity of said section, and releasing the inert fluid from the isolated section.

2. A method of isolating and simultaneously evacuating a section of pipeline, comprising installing externally controlled plug stopping devices in the wall of said pipeline at points defining the upstream and downstream extremities of said section, installing an auxiliary, externally controlled plug stopping device in the wall of said pipeline at a point adjacent to but spaced downstream from said upstream stopping device, independently introducing first and second portable, radially expandible plugs into said pipeline anterior to said upstream extremity, sequentially transporting said plugs through said pipeline by means of the fluid flowing therein, stopping said first plug by actuating said auxiliary plug stopping device, by-passing the fluid in said pipeline from behind said first plug to a point in said pipeline in advance thereof, stopping and expanding said second plug at the upstream extremity of said section, releasing said first plug from said auxiliary stopping device, introducing into said section behind said first plug an inert pressure fluid, transporting said first plug through said section under the force of said inert fluid to thereby evacuate the fluid in advance thereof, stopping and expanding said first plug at the downstream extremity of said section, and releasing said inert fluid from the isolated section.

3. A method as claimed in claim 2, wherein said plugs are hydraulically expanded.

4. A method as claimed in claim 3, wherein the introduction of said second plug is delayed for a predetermined time after the introduction of said first plug.

5. A method of isolating and simultaneously evacuating a section of pipeline, comprising sequentially transporting two radially expandible plugs at spaced intervals through a pipeline under the influence of the fluid flowing therethrough, temporarily stopping the first plug at a point just downstream of the upstream teminus of the section to be isolated, independently stopping and expanding the second plug at said upstream terminus, releasing said first plug, introducing an inert fluid in said section behind said first plug to continue its downstream transportation while evacuating the fluid in advance thereof, stopping and expanding said first plug at the downstream terminus of said section, and releasing said inert fluid from said isolated section.

6. In a pipeline plugging apparatus, a plugging unit comprising an annular body adapted to be coaxially inserted in a pipeline, push cup means on said body responsive to the fluid pressure in said pipeline for internally transporting the unit through the pipeline, at least one externally controlled stopping and positioning member selectively projectible radially into said pipeline, locking means on said body engageable with said member for securing said unit in a selected position in said pipeline, a cam nose on the leading end of said body engageable with said positioning member for rotating said body to align the locking means therein with said stopping and positioning member, a hydraulically operated expansible element concentrically arranged on said unit for sealing the interior of said pipeline, and means associated with said externally controlled stopping and locking member for operating said expansible element.

7. Pipeline plugging apparatus as claimed in claim 6, wherein said externally controlled stopping and positioning member is provided at its inner end with a locking element, a locking recess associated with said cam nose for receiving said locking element, and having a forwardly flaring guide throat for directing said locking element into said recess.

8. Apparatus as claimed in claim 7, wherein said stopping and positioning member comprises a tubular pin, a longitudinally projectible and retractible pressure fluid tube extending through said tubular pin, a valve in said annular body aligned with said tube for controlling the admission of pressure fluid to said expansible element, means on the inner end of said pressure fluid tube for actuating said valve upon the inward projection of said tube, a source of hydraulic pressure communicating with the outer end of said tube, and externally controlled means for projecting and retracting said tube.

9. The method of blocking off a section of pipeline, including introducing into the pipeline at a point upstream from said section a plug device having a packing element adapted to be inflated into contact with the inner surface of said section of the pipeline, introducing a propellant fluid into the pipeline upstream from the plug device to propel the plug device through the pipeline to the section to be blocked, stopping the plug device at the place to be blocked, introducing an inflating medium into the packing element for inflating the packing element into sealing contact with the inner surface of said section and retaining the inflating medium within the packing element to maintain said sealing contact.

10. The method of blocking off a section of pipeline and then reestablishing flow through said section, including introducing into the pipeline upstream from said section a plug device having a packing element adapted to be inflated into contact with the inner surface of said section of the pipeline, introducing a propellant fluid into the pipeline upstream from the plug device to propel the plug device through the pipeline, stopping the plug device at the place to be blocked, introducing an inflating medium into the packing element for inflating the packing element into sealing contact with the inner surface of said section, retaining the inflating medium within the packing element to maintain said sealing contact, exhausting the inflating medium from the packing element to free the plug device, and continuing flow of pipeline fluid to propel the plug device to a place of removal from the pipeline.

11. The method of blocking off a section of pipeline having an annular wall, including introducing into the pipeline at a point upstream from the section to be blocked a plug device having a packing element adapted to be inflated into contact with the inner surface of said section of the pipeline, introducing a propellant fluid into the pipeline upstream from the plug device to propel the plug device to the place to be blocked, stopping the plug device upon arrival at the place to be blocked, supplying an inflating medium exteriorly of the pipeline, connecting the supply of inflating medium with the packing element through the wall of the pipeline, flowing the inflating medium into the packing element for inflating the packing element into sealing contact with the inner surface of said section, retaining pressure of the inflating medium in the packing element from a point exteriorly of the pipeline to block flow in the section of the pipeline, exhausting the inflating medium through said connection to the exterior of the pipeline, removing said connection, and releasing the stopped plug device for removal through the pipeline by the propellant fluid.

12. The method of removing pipeline fluid from a section of pipeline and blocking the pipeline up and downstream from ends of said section, including the steps of introducing into the pipeline at a point upstream from said section plug devices in tandem and each having an inflatable packing element, introducing a propellant fluid into the pipeline upstream from the plug devices to propel the plug devices downstream, stopping the rear plug device before entrance of the rear plug device into said section, introducing a pressure fluid upstream from the foremost plug device to continue movement of the foremost plug device, removing the pipeline fluid from said section simultaneously with progress of the foremost plug device, stopping the foremost plug device after passage through said section, and inflating the packing elements of the plug devices.

13. The method of removing pipeline fluid from a section of a pipeline and blocking the pipeline up and downstream from ends of said section, including the steps of introducing into the pipeline at a point upstream from said section plug devices in tandem and each having an inflatable packing element, propelling the plug devices downstream under flow of the pipeline fluid, stopping the rear plug device before entrance of the rear plug device into said section, introducing an exterior pressure fluid into the pipeline to propel the foremost plug device through said section to push the pipeline fluid therahead, stopping the foremost plug device after passage from said section, inflating the packing elements to complete said blocking of the pipeline from the up and downstream ends of said section, shutting off the flow of exterior pressure fluid, deflating the packing elements, releasing the plug devices, and continuing flow of the pipeline fluid to propel the plug devices to a place of removal.

14. A pipeline plug device, including a core, an inflatable packing element encircling the core, cups on the core at the ends of the packing element and having flexible flange portions adapted to form seals with the inner surface of a pipeline having an annular wall to support the core axially within the pipeline and for effecting movement of the plug device into plugging position responsive to flow of a pressure fluid within the pipeline, means for connection with said wall of the pipeline in said plugging position for providing an opening through the wall of the pipeline while retaining the pressure fluid in the pipeline, and means for introducing a pressure fluid through said opening and into the inflatable packing element to expand the packing element into contact with said wall of the pipe for anchoring the plug device in said plugging position.

15. A pipeline plug, including a core, an annular packing element encircling the core, cups on the core and having flexible annular flange portions for providing sealing contact with the inner surface of a pipeline, heads on the ends of the core, the marginal edge of the forward of said heads providing a stop contacting face, an annular flange carried by the forward head and having a radial flange spaced therefrom and of less diameter than said head to provide a stop contact face, and stops for projection into a pipeline in which the pipeline plug is to be used for engaging said stop contacting faces for holding the plug device from movement in either direction in said pipeline.

References Cited by the Examiner
UNITED STATES PATENTS

| | | | |
|---|---|---|---|
| 2,399,544 | 4/1946 | Danner | 138—93 |
| 2,786,489 | 3/1957 | Morrill | 138—89 |
| 2,843,154 | 7/1958 | Hosking | 138—93 |
| 2,929,410 | 3/1960 | Morrison | 138—97 |
| 3,040,779 | 6/1962 | Guier | 138—97 |

LAVERNE D. GEIGER, *Primary Examiner.*

EDWARD V. BENHAM, *Examiner.*

H. ARTIS, *Assistant Examiner.*